(12) United States Patent
McGuire et al.

(10) Patent No.: US 12,163,010 B2
(45) Date of Patent: Dec. 10, 2024

(54) CELLULOSE-BASED ADMIX AND PROCESSES FOR FABRICATING A LIGHTWEIGHT CONCRETE SUBSTITUTE AND BUILDING COMPONENTS FOR CONSTRUCTION

(71) Applicants: Joshua Allen McGuire, Lake Charles, LA (US); Leslie Abdalla McGuire, Lake Charles, LA (US)

(72) Inventors: Joshua Allen McGuire, Lake Charles, LA (US); Leslie Abdalla McGuire, Lake Charles, LA (US)

(*) Notice: Subject to any disclaimer, the term of this patent is extended or adjusted under 35 U.S.C. 154(b) by 492 days.

(21) Appl. No.: 16/583,200

(22) Filed: Sep. 25, 2019

(65) Prior Publication Data

US 2020/0102445 A1  Apr. 2, 2020

Related U.S. Application Data

(60) Provisional application No. 62/806,974, filed on Feb. 18, 2019, provisional application No. 62/775,384, filed on Dec. 4, 2018, provisional application No. 62/739,209, filed on Sep. 29, 2018.

(51) Int. Cl.
| | |
|---|---|
| *C08L 1/02* | (2006.01) |
| *C04B 7/02* | (2006.01) |
| *C04B 16/02* | (2006.01) |
| *C04B 103/20* | (2006.01) |
| *C04B 103/63* | (2006.01) |
| *C08K 3/34* | (2006.01) |

(52) U.S. Cl.
CPC ........ *C08L 1/02* (2013.01); *C04B 7/02* (2013.01); *C04B 16/02* (2013.01); *C04B 2103/20* (2013.01); *C04B 2103/63* (2013.01); *C08K 3/346* (2013.01); *C08L 2201/02* (2013.01)

(58) Field of Classification Search
CPC .................................. C08L 1/02; C04B 16/02
See application file for complete search history.

(56) References Cited

U.S. PATENT DOCUMENTS

| | | | |
|---|---|---|---|
| 9,834,652 B2* | 12/2017 | Zhang | ........................ C08J 5/18 |
| 2005/0229809 A1* | 10/2005 | Lally | ........................ C09D 5/18 |
| | | | 106/18.14 |
| 2017/0152190 A1* | 6/2017 | Ko | ........................ C04B 33/1305 |

FOREIGN PATENT DOCUMENTS

| | | | | |
|---|---|---|---|---|
| EP | 0346559 A2 * | 6/1988 | ............... | B27N 1/00 |
| WO | WO-9217416 A1 * | 10/1992 | ............. | C04B 18/26 |

OTHER PUBLICATIONS

Definition of the word "fine" obtained 3/3/0/2022 at https://www.merriam-webster.com/dictionary/fine.*

* cited by examiner

*Primary Examiner* — Arrie L Reuther

(57) ABSTRACT

A lightweight insulative and fire-retardant building material and component and manufacturing process are disclosed. The building material is based on cellulose impregnated with clay and can be formed in the form of posts, columns, bricks, blocks, and panels.

5 Claims, 3 Drawing Sheets

CELLULOSE-BASED ADMIX AND PROCESSES FOR FABRICATING A LIGHTWEIGHT CONCRETE SUBSTITUTE AND BUILDING COMPONENTS FOR CONSTRUCTION

RELATED APPLICATIONS

The present application claims the benefit of U.S. Provisional Patent Application Nos. 62/739,209, 62/775,384, and 62/806,974, filed on Sep. 29, 2018, Dec. 4, 2018, and Feb. 18, 2019, respectively, all of which are incorporated herein by reference.

FIELD

The present disclosure relates generally to construction materials and processes, and in particular to a novel cellulose-based admix and processes for fabricating lightweight insulative fire-retardant building components for use in construction.

BACKGROUND

Cement is typically sold to the average consumer in 50-90 pound bags. For many consumers, the bulk and weight of these bags of cement is simply unmanageable or even impossible to work with. Further, in order to use the cement, it has to be mixed with gravel, sand, water, and other materials, and then poured into a mold or form that has to be prefabricated or made on-site.

DETAILED DESCRIPTION

A lightweight recycled cellulose-based admix described herein can be utilized in conjunction with Portland cement products to fabricate thermally insulative and fire-retardant building components, including bricks, blocks, panels (i.e., oriented strand board and plywood substitutes), posts, columns, beams, and other types of structural components and supports. This process not only yields lightweight insulative, fire-proof, and anti-ballistic construction products but also substantially reduces costs and offset the carbon footprint of a construction project. For every two pounds of wood byproduct that is incorporated into the admix, one pound of carbon is permanently removed from the atmosphere and sequestered.

Figure 1:
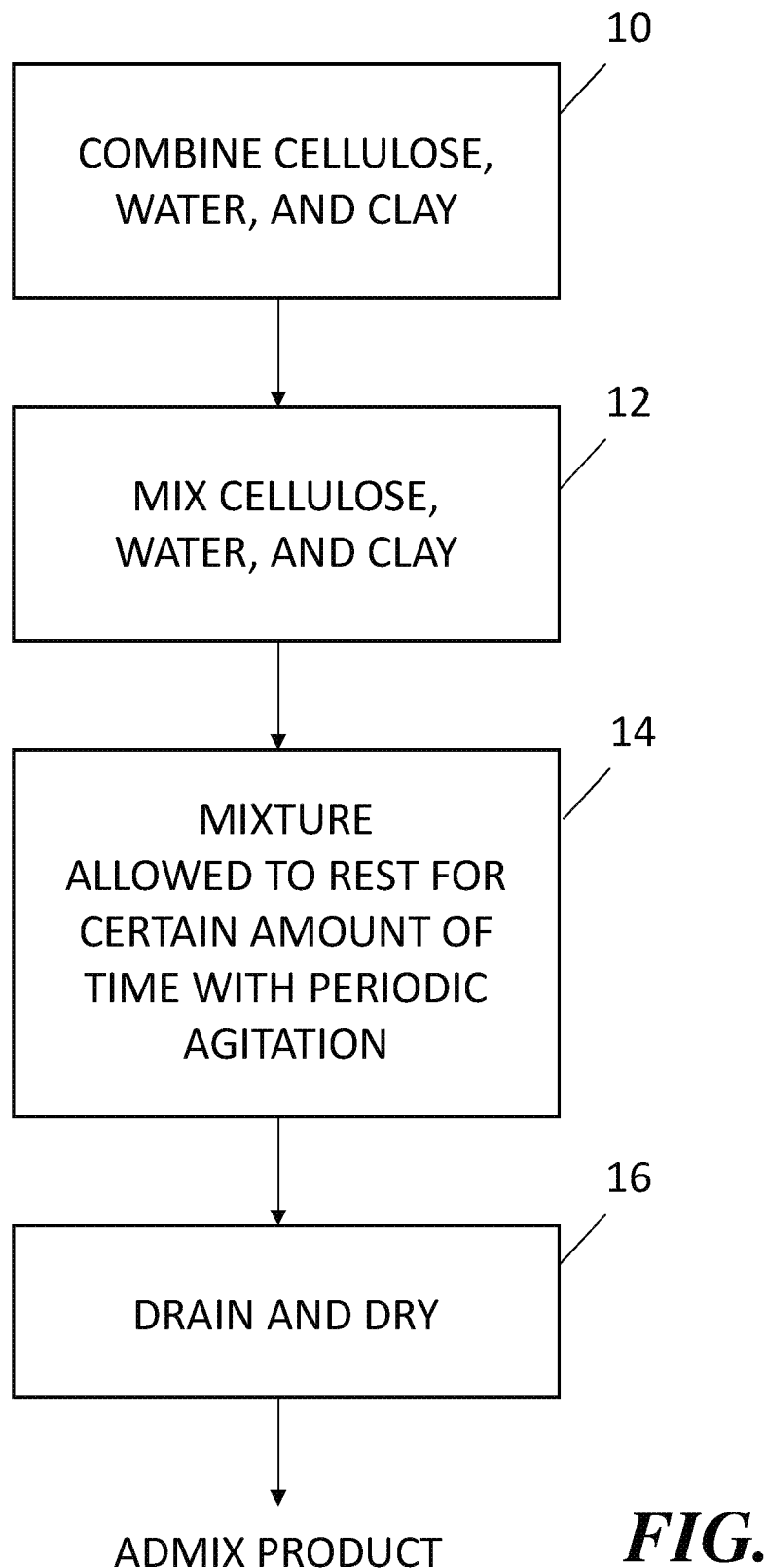
FIG. 1 is a flowchart of an exemplary embodiment of a manufacturing process of a lightweight admix product according to the teachings of the present disclosure.

Referring to FIG. 1, the lightweight admix can be made by first combining by folding and mixing a light fine clay, and water with an organic cellulose material of certain sizes (blocks 10 and 12) that can be as small as microscopic particles and as large as an entire tree, including sawdust, wood chips, wood flakes, wood strips, fiber, bamboo, hemp, burlap, tweed, organic waste, and animal waste both liquid and solid form. The ratios of the three main components (cellulose material, water, and fine clay) can be varied dependent on the desired characteristics of the final product. Saw dust is a desirable material to use as it is a waste product of the lumber industry. Green cellulose can be air dried or dried with an application of heat (e.g., in a kiln) to remove excess moisture. The cellulose, clay, and water can be mixed together using a paddle mixer to ensure that the cellulose is well-hydrated, the clay particles are well-dispersed in the mixture (emulsification), and the cellulose fibers are well-coated with the clay emulsification. Alternatively, the clay can be mixed with the water first and then the sawdust/cellulose can be added to the emulsified clay/water mixture. This causes the fine clay particles and minerals present in the clay to be impregnated in the cellulose, filling all voids between the fibers and particles. The cellulose-water-clay mixture is then allowed to stand, with periodic mixing or agitation, for a time period, such as a number of days (block 14). Then the mixture is poured out and evenly spread over a flat and water permeable surface that allows moisture to be drained and removed from the cellulose-clay mixture (block 16). A tumbling barrel with water-permeable sides may be used to remove the moisture, with or without added heat and/or air movement. The treated cellulose can be air dried this way, or an application of heat at a certain temperature with or without forced air and/or vacuum may be used to speed up the process. The amount of clay present in the mixture can be increased to increase the compressive strength, depending on the desired characteristics of the end product. The dried cellulose-based admix is composed of cellulose thoroughly coated and impregnated with fine clay particles and minerals. The result is an admix product that can be used in cement mixtures that produces a lightweight but strong construction material.

Figure 2:
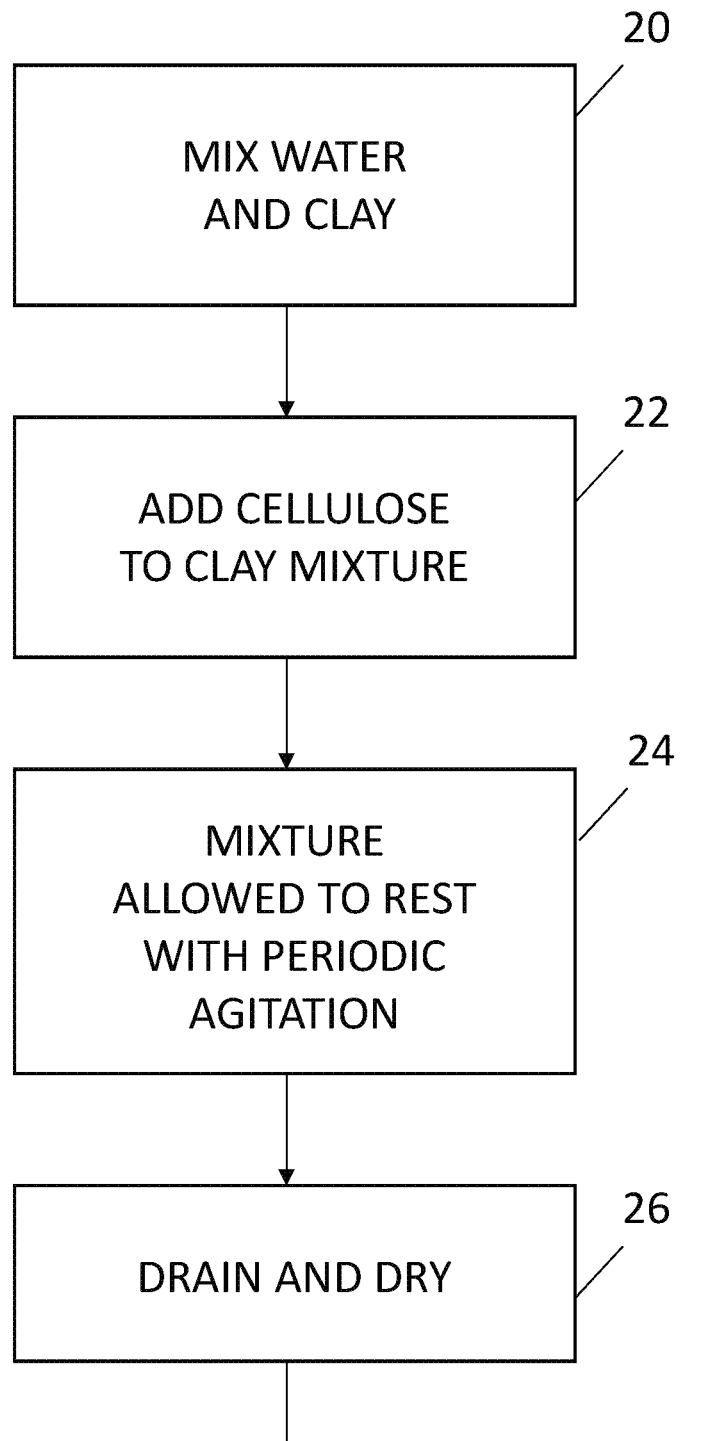
FIG. 2 is a flowchart of another exemplary embodiment of a manufacturing process of a lightweight admix product according to the teachings of the present disclosure.

Referring to FIG. 2, an exemplary alternative manufacturing process is shown. A fine clay is first mixed with water at a predetermined ratio (block 20). The cellulose material is then added to the clay mixture (block 22). The mixture is then allowed to soak and rest, with periodic agitation (block 24). The mixture is then allowed to drain and dried (block 26). Heat, forced air circulation, and/or vacuum may be used during the drying process.

Figure 3:
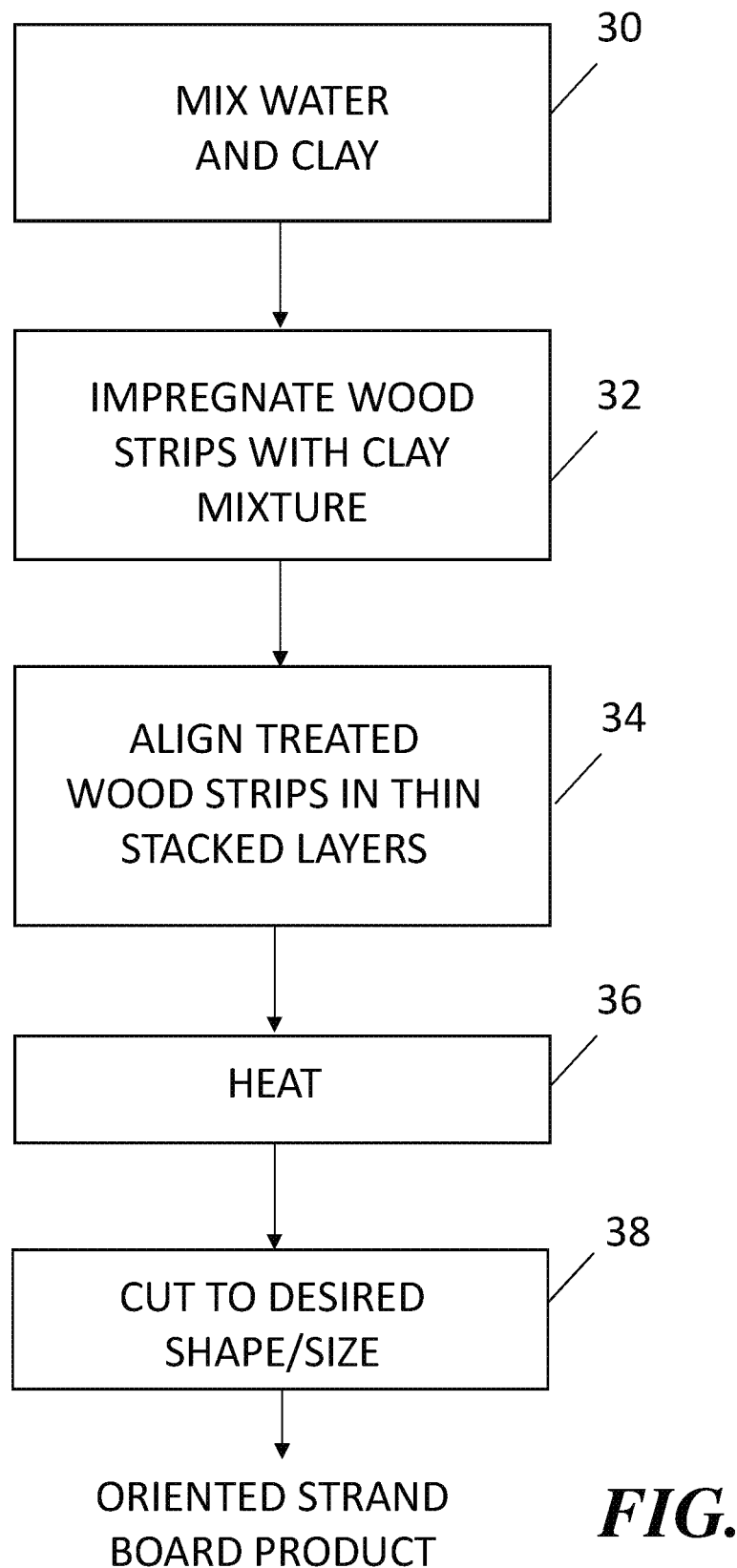
FIG. 3 is a flowchart of an exemplary embodiment of a manufacturing process of a lightweight oriented strand board product according to the teachings of the present disclosure.

FIG. 3 shows an exemplary manufacturing process to fabricate an oriented strand board (OSB) substitute. Clay and water of a certain ratio is mixed thoroughly (block 30), and then strips of wood or wood flakes/chips are added to the emulsified mixture (block 32). After a predetermined of soaking, and optionally agitation, hydration, dehydration (e.g., kiln or air drying), and vacuum, the wood strips are thoroughly impregnated with the clay mixture. The treated wood strips are then sifted and oriented on a belt. The mat is made in a forming line. Treated wood strips on the external layers are generally aligned to the panel's strength axis while those on the internal layers are oriented perpendicularly (block 34). The number of layers is determined partly by the desired thickness of the panel or component and other factors. The mat is placed in a thermal press to compress the strips and bond them by heat activation and curing of the resin that has been coated on the flakes (block 36). Individual panels can then be cut from the mats into finished sizes (block 38).

In an alternative process, the cellulose admix may be poured into a mold, drained, and dried into desired shapes and sizes.

The level of penetration and corresponding impregnation of clay particulates into the cellulose material is in direct correlation to the clay to water ratios, the amount of soak time, the amount of vacuum pressure applied, the frequency of vibration, and the speed at which the moisture is removed from the saturated wood product.

For the fabrication of fire-retardant panels or structural products, the ratio of the clay may be reduced slightly compared to the water. Optionally, excess clay may also be rinsed from the admix before the drying phase so that a cleaner surface is available for optimal bonding.

Additional additive materials that can be added to form the admix include graphene, crystalline expander, carbon-based materials, sand, silt, peat, loam, chalk, fly ash, recycled paper, phosphate, lime, calcium, magnesium, sugars, lignin, vegetable and animal proteins, almond flour, coconut flour, buckwheat flour, teff flour, quinoa flour, corn flour, wheat flour, barley flour, rice flour, rye flour, tree sap, syrup, sugars, tars, nut shells and husks, corn husks, grass clippings, any by product from the production of rice, wheat, and other grain, ethylene glycol derivatives, ionic water, salt, acids, alkaline, alcohol, bleach, and biodegradable surfactants (including H2). These materials can also be added to the admix, silica/sand, and cement, and water to fabricate the end product used in construction, either poured into forms or poured on-site. The admix, silica/sand, and cement may be bagged as a dry mix that can be mixed with water on-site.

The lightweight cellulose-based cement mix (admix, silica/sand, cement, and water) can be compressed, shaped, molded, sprayed, and otherwise formed to fabricate structural building components such as panels, beams, columns, posts, floors, walls, ceilings, etc. that possess excellent thermal insulative, sound insulative, fire-retardant, energy absorption, anti-ballistic, and thermal mass characteristics.

The present disclosure further describes a first inventive concept that produces a lightweight construction block constructed of a biodegradable flexible bag or container containing a lightweight cement mix that can be mixed with water right inside the container to activate the cement. In a preferred embodiment, the lightweight cement mix includes cement, clay, sand, cellulose, and fly ash made from rice hull. The cement mixture can be properly mixed inside the flexible bag/container in-place, and arranged, stacked, and optionally secured with rebars to construct 2-D and 3-D structures including, for example, garden bed edging, raised garden beds, pavers, walkways, fire rings and fire pits, steps, low walls, retaining wall systems, structural wall systems, roofing tile systems, drainage and culvert systems, driveway, roadway systems, highway barrier systems, parking lot curb and bump systems, foundation systems (footing and slab), DIY tornado and hurricane shelters, Hesco barrier military applications (highly blast and projectile resistant), flood barrier fencing applications, fireplaces, and chimneys. The resultant structure built from this lightweight construction block would possess improved properties over one constructed of conventional concrete. The resultant structure built from these construction blocks can withstand high temperatures and is fire-resistant, blast-resistant, projectile-resistant, impact-resistant, sound-proof, and thermally-insulative. The construction block is also impervious to termites and rot. Because of the incorporation of cellulose, a waste product produced typically from lumber processing, the use of this construction block is environment-friendly and can be used to offset the carbon footprint or emissions of the construction project. For every two pounds of wood byproduct that is incorporated into the admix, one pound of carbon is permanently removed from the atmosphere and sequestered. The use of these blocks also results in cost-savings for the overall construction project.

In a preferred embodiment, an inner layer of the flexible container includes a plastic bag, with an outer layer comprised of a paper bag of a suitable thickness. The flexible container is preferably rectangular in shape with straight sides and square corners, but can take on any desirable shape and dimensions. The flexible container may be manufactured by putting a plastic layer inside a paper layer, where a self-sealing port can be formed by applying a silicone elastomer gel in a predetermined configuration at a certain thickness at the interface of the plastic layer and paper layer. The silicone elastomer gel may be laid down in a circular, square, rectangular, triangular, and any other suitable shape.

The flexible container can be manufactured by putting a plastic bag inside a paper bag and sealing the open end shut after a predetermined amount of the lightweight cement mixture (admix, sand, and cement) is added to the bags. The open end can be sealed by conventional methods such as using heat sealing, adhesive, stitching, etc. The inner plastic layer tends to impart a glossy surface to the finished block. Preferably, the plastic bag is fabricated from a biodegradable material, such as BIOBAG made from a resin derived from plant matter, vegetable oils, and compostable polymers. Other biodegradable products currently exist that can be employed herein, including a plastic material made from wood from VTT Technical Research Centre of Finland, a compostable and water-soluble plastic bag from Avani Eco, a seaweed-based material from Evoware, and others. Even though the utilization of the biodegradable material in the flexible container would subject it to water, the fast absorption rate of water by the cellulose in the cement mix allows the flexible container to maintain its integrity and shape while the cement mix is being worked on, molded, and cured. The flexible container can also be constructed of one or multiple layers of paper of suitable thickness. The inner surface of the flexible container may be patterned to take on the contours of desired design, such as brick, slate, stone, wood, etc. After the lightweight cement mix is put inside the flexible container, the open end can be sealed with adhesives, stitching, and any suitable method.

The lightweight construction block 100 is preferably marketed and sold with the flexible container containing the proper amount of lightweight cement mix (admix, sand, and cement) with the self-sealing opening at one end. It is preferable that the size and weight of the construction block makes it easy to handle, carry, transport, and use by the average consumer for DIY construction projects. The lightweight construction blocks can be used as the basis for any structural construction project.

Also marketed and sold with the lightweight construction blocks is an injection nozzle. The injection nozzle includes a threaded female connector with a shut-off valve that can be easily attached to a conventional water hose. Integral to the hose connector is an elongated hollow injection tube that has a closed end and multiple series of small lateral openings down the length and around the circumference of the injector tube. The elongated hollow tube can be straight or tapered and be fabricated of metal. The injection nozzle can be inserted into the construction block container via the self-healing port to introduce water into the flexible container. The injection nozzle may be used with a pressure regulator that maintains a certain flowrate in the hose and injection nozzle. The user is instructed to allow water to flow for a certain time period, such as a number of seconds. The length of the injection tube is no longer than the length of the construction block so that the end of the injector nozzle, when inserted into the block, cannot easily poke through the other end of the block. After a certain number of seconds, the user can shut off the flow of water to the injection nozzle, and withdraw the injection nozzle from the construction block. The self-healing port automatically seals off the opening made by the injection nozzle.

The user can then knead, roll, and work the mixture in the flexible container to thoroughly distribute the water throughout the mix. The use of plastic and/or paper as the envelope of the flexible container makes it easy to work the cement mix and water mixture. The user may then lay down multiple construction blocks in a predetermined pattern, such as a bricklayer pattern, and construct the desired structure.

An insert may be used inside the flexible container to add contoured surface features for aesthetic purposes. The insert is preferably constructed of a biodegradable material such as cardboard. The insert may line one side of the flexible container, the side that will be outward facing when the construction block is positioned during construction process. The surface texture of the construction block can be altered or enhanced by attaching or gluing irregular pieces of paper to the inward-facing surface cardboard insert.

It should be noted that the cement mix comprises cement, clay, sand, cellulose, and fly ash made from rice hull. The cement mix may also include one or more other additives. The cement mix may also include a dye or another colorant or substance that causes the resultant construction block and structure to have a certain desirable color and appearance. The biodegradable plastic and paper layers of the flexible container would degrade and allow the construction block to be exposed.

It should be noted that the self-healing port may instead or additionally include the use of a one-way valve defined and formed in the plastic/paper wall of the flexible container to allow the entry of the injection nozzle and blocking escape of the cement mix and water inside the flexible container.

The ingredient ratios and mix composition as well as the process can be varied and modified to develop specific attributes to be utilized in a broad spectrum of end product requirements ranging from but not limited to, thermal insulative, explosive energy absorption, ballistic resistance (HESCO Alternative), acoustical improvement (sound deadening), fire retardant abilities, severe and catastrophic weather events, energy absorbing ability (highway barriers), waterproofing attributes and abilities, extreme termite resistance, the ability to entomb carbon forming a carbon trap with tremendous ecological benefit, load bearing semi-flexible wall and roof systems, lightweight waterproof impact resistant roofing tile and systems, monolithic slabs, modular floating interlocking slab systems, interlocking block and brick wall systems, landscaping products with added benefits to plant life, lightweight recycled bagged concrete alternative to heavy traditional concrete premix bags. The admix product may be used in both wet cast and dry cast formats and methods.

The present disclosure describes a process to pretreat a cellulose-based structural building component fabricated from cellulose impregnated with clay. The structural components can be used in a wide variety of construction projects. Additionally, the cellulose-based admix can be used as the base material for thermal insulation that is sprayed onto walls and ceilings.

The present disclosure describes a process to pretreat a cellulose-based admix that can then be used to be mixed with water, silica/sand (optional), cement, and fly ash (optional) to fabricate a variety of lightweight products with high tensile and compressive strength that can be used in a wide variety of construction projects. The end product is a construction material that spans the space in applications and utility between lumber and concrete.

These lightweight cellulose-based cement structural components can be used to build, for example, garden bed edging, raised garden beds, walkways, fire rings and fire pits, pavers, non-structural walls, outdoor stairs, retaining wall systems, structural wall systems, roofing tile systems, drainage and culvert systems, driveway, roadway systems, highway barrier systems, parking lot curb and bump systems, foundation systems (footing and slab), DIY tornado and hurricane shelters, Hesco barrier military applications (highly blast and projectile resistant), flood barrier fencing applications, fireplaces, and chimneys. The resultant structures would possess improved properties over one constructed of conventional concrete. The resultant end product can withstand high temperatures and is fire-resistant, blast-resistant, projectile-resistant, impact-resistant, sound-proof, thermally-insulative, and be impervious to termites and rot. Because of the incorporation of cellulose, a waste product produced typically from lumber processing, the construction block is environmentally-friendly and cost-savings for the overall construction project using the lightweight cement mix.

The finished cellulose-based admix can be utilized as a yield enhancing device in cementitious, ceramic, polymeric, and resin-based batching environments. An example of this in cementitious format: a standard 80 lb. bag of concrete typically yields around 0.60 cubic of finished product after water is added. With the use of the admix described herein, the finished yield can be increased to approximately 1.2-1.4 cubic foot for the same bag of concrete.

The features of the present invention which are believed to be novel are set forth below with particularity in the appended claims. However, modifications, variations, and changes to the exemplary embodiments of the novel cellulose-based admix and process for fabricating lightweight insulative fire-retardant building structural components described above will be apparent to those skilled in the art, and the described herein thus encompasses such modifications, variations, and changes and are not limited to the specific embodiments described herein.

What is claimed is:

1. An insulative fire-retardant construction component comprising a sawdust material impregnated with fine clay, wherein the sawdust material comprises particles and fibers and wherein voids between the sawdust particles and fibers are filled with the fine clay-,
    a plurality of layers of wood strips impregnated with fine clay and oriented in specific axes;
    a first outer layer of wood strips generally oriented along a first axis the wood strips being impregnated with fine clay;
    a plurality of center layers of wood strips generally oriented along a second axis perpendicular to the first axis the wood strips being impregnated with fine clay;
    a second outer layer of wood strips generally oriented along the first axis, the wood strips being impregnated with fine clay; and
    the above layers of wood strips being bonded together using a resin.

2. The construction component of claim 1, further comprising cement.

3. The construction component of claim 1, further comprising cellulose material impregnated with fine clay, wherein the cellulose material is selected from the group consisting of wood chips, wood flakes, wood strips, fiber, bamboo, hemp, burlap, tweed, organic waste, and animal waste.

4. The construction component of claim 1, wherein the construction component is formed into a specific shape and size.

5. The construction component of claim 1, further comprising a biodegradable flexible bag containing the sawdust material impregnated with fine clay, cement, and sand.

* * * * *